(12) United States Patent
Rottle et al.

(10) Patent No.: US 11,243,368 B1
(45) Date of Patent: Feb. 8, 2022

(54) FIBER OPTIC CABLE CLAMP

(71) Applicant: The United States of America as represented by the Secretary of the Navy, Arlington, VA (US)

(72) Inventors: Brandon Rottle, Tacoma, WA (US); Mitch Van Epps, Seabeck, WA (US); Steven Kyle Denton, Wauna, WA (US); Robert Lutes, Silverdale, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 0 days.

(21) Appl. No.: 16/873,502

(22) Filed: Apr. 22, 2020

Related U.S. Application Data

(60) Provisional application No. 62/995,061, filed on Jan. 8, 2020.

(51) Int. Cl.
| | |
|---|---|
| *G02B 6/44* | (2006.01) |
| *H02G 3/32* | (2006.01) |
| *F16L 3/10* | (2006.01) |
| *G02B 6/36* | (2006.01) |

(52) U.S. Cl.
CPC .............. *G02B 6/4471* (2013.01); *F16L 3/10* (2013.01); *F16L 3/1025* (2013.01); *H02G 3/32* (2013.01); *G02B 6/3616* (2013.01)

(58) Field of Classification Search
None
See application file for complete search history.

(56) References Cited

U.S. PATENT DOCUMENTS

| | | | | |
|---|---|---|---|---|
| 4,199,070 A | * | 4/1980 | Magnussen, Jr. ...... | A47B 63/02 138/112 |
| 5,794,897 A | * | 8/1998 | Jobin ..................... | H02G 7/053 24/459 |
| 5,941,483 A | * | 8/1999 | Baginski ................. | F16L 3/22 248/68.1 |
| 6,561,466 B1 | * | 5/2003 | Myers ..................... | F16L 3/221 248/68.1 |
| 2001/0036340 A1 | * | 11/2001 | Schoch ................ | G02B 6/3879 385/71 |
| 2003/0025048 A1 | * | 2/2003 | Knotts .................. | F16L 3/2235 248/68.1 |
| 2010/0193651 A1 | * | 8/2010 | Railsback ............... | F16L 3/237 248/229.24 |

(Continued)

FOREIGN PATENT DOCUMENTS

| | | | |
|---|---|---|---|
| EP | 0268180 A2 | * | 5/1988 |
| EP | 0724104 A1 | * | 7/1996 |

OTHER PUBLICATIONS

Stratasys, "ULTEM 9085 Production-Grade Thermoplastic for Fortus 3D Printers", copyright 2017. Retrieved from http://www.stratasys.com/-/media/files/material-spec-sheets/mss_fdm_ultem9085_1117a.pdf (Year: 2017).*

*Primary Examiner* — Michael Stahl
(74) *Attorney, Agent, or Firm* — Stephen J. Leahu; Naval Undersea Warfare Center

(57) ABSTRACT

A fiber optic cable clamp has two identical halves that snap together forming the clamp. The clamp can be made of thermoplastic materials and designed to permit stacking of multiple clamps without damaging the cables.

11 Claims, 17 Drawing Sheets

(56) References Cited

U.S. PATENT DOCUMENTS

| | | | | |
|---|---|---|---|---|
| 2012/0298417 | A1* | 11/2012 | Kempeneers | G02B 6/4471 |
| | | | | 174/77 R |
| 2014/0060922 | A1* | 3/2014 | Weyrich | H02G 3/0406 |
| | | | | 174/70 R |
| 2017/0227141 | A1* | 8/2017 | Toll | F16L 3/237 |
| 2017/0321663 | A1* | 11/2017 | Schmitt | F03D 80/85 |

* cited by examiner

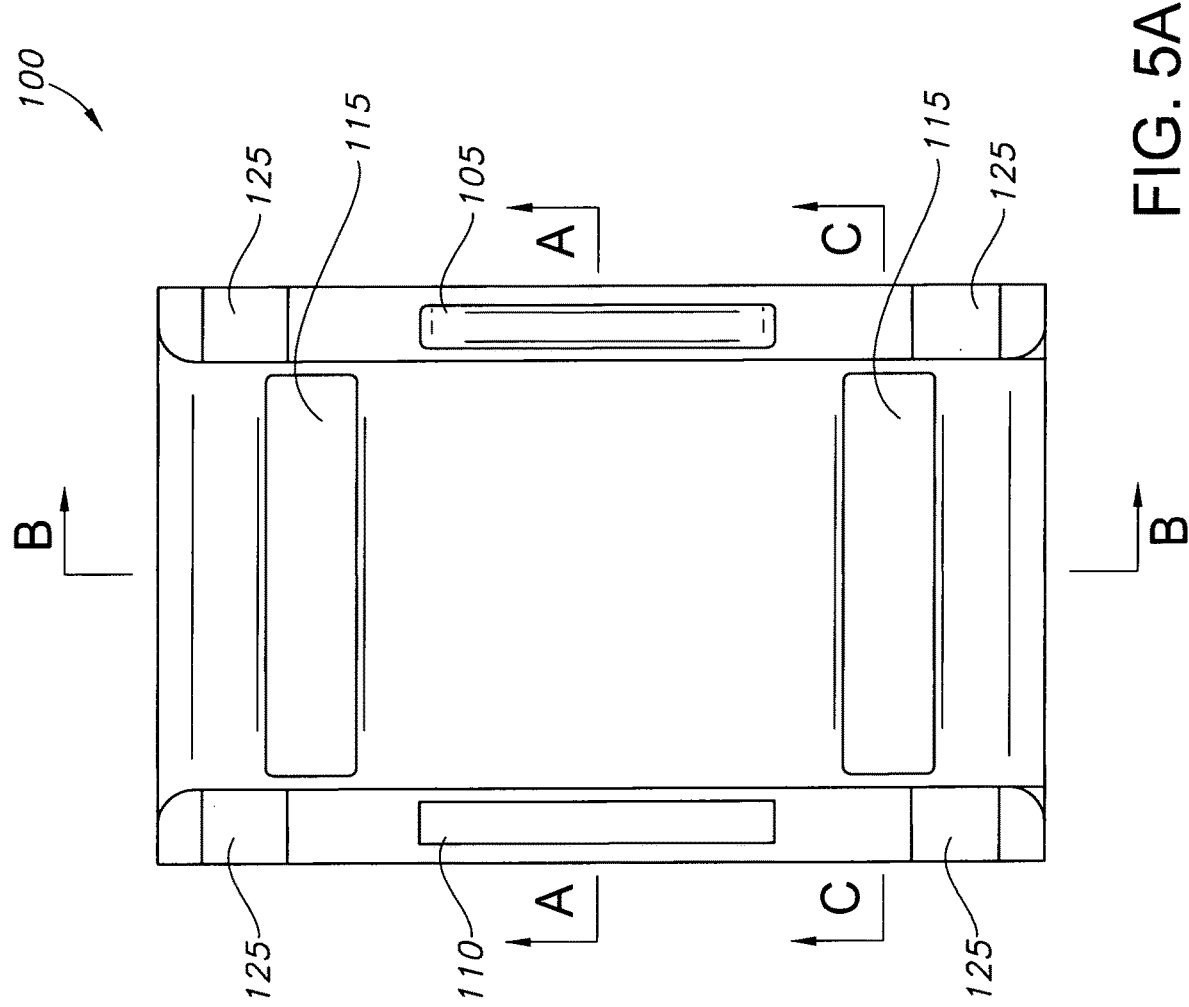

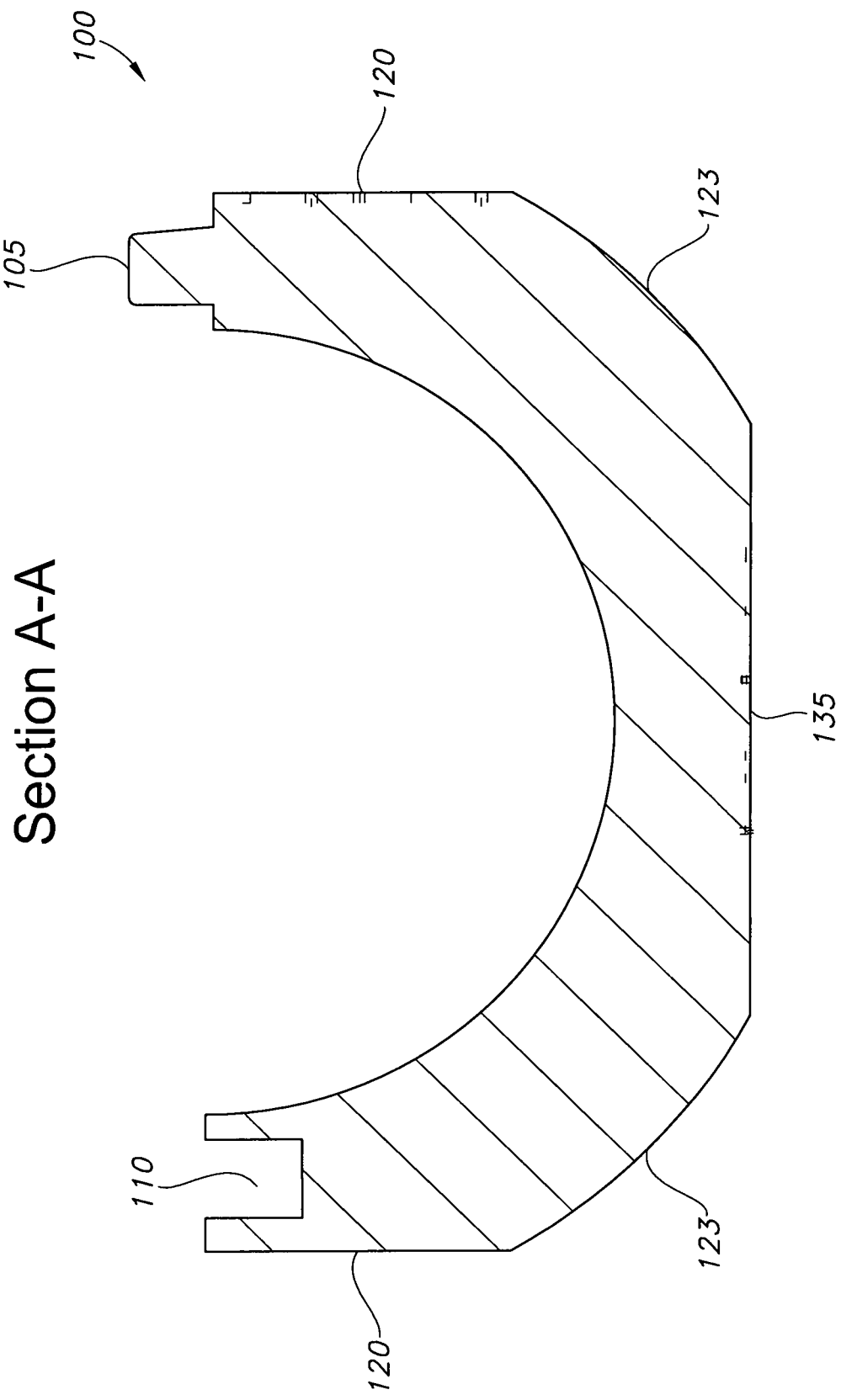

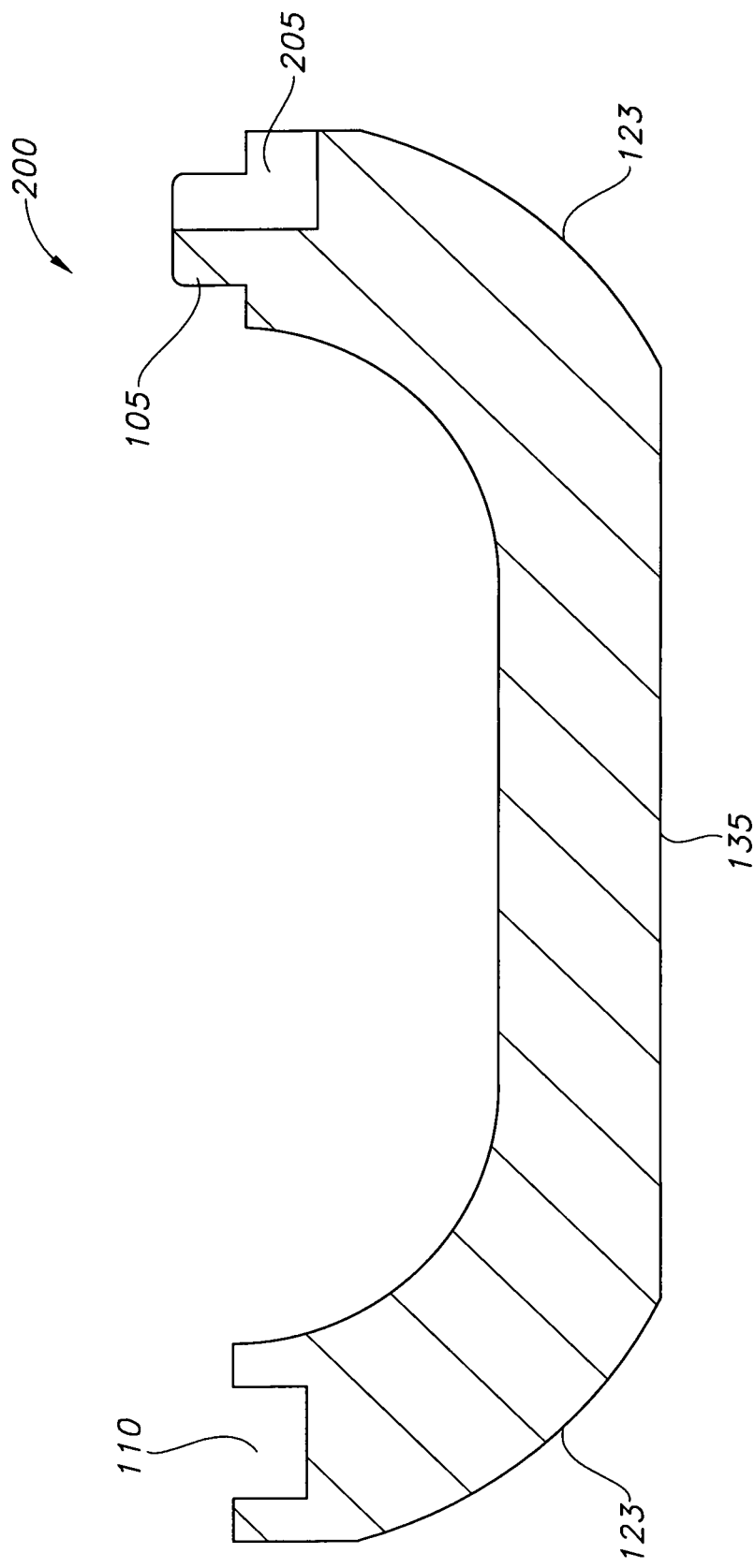

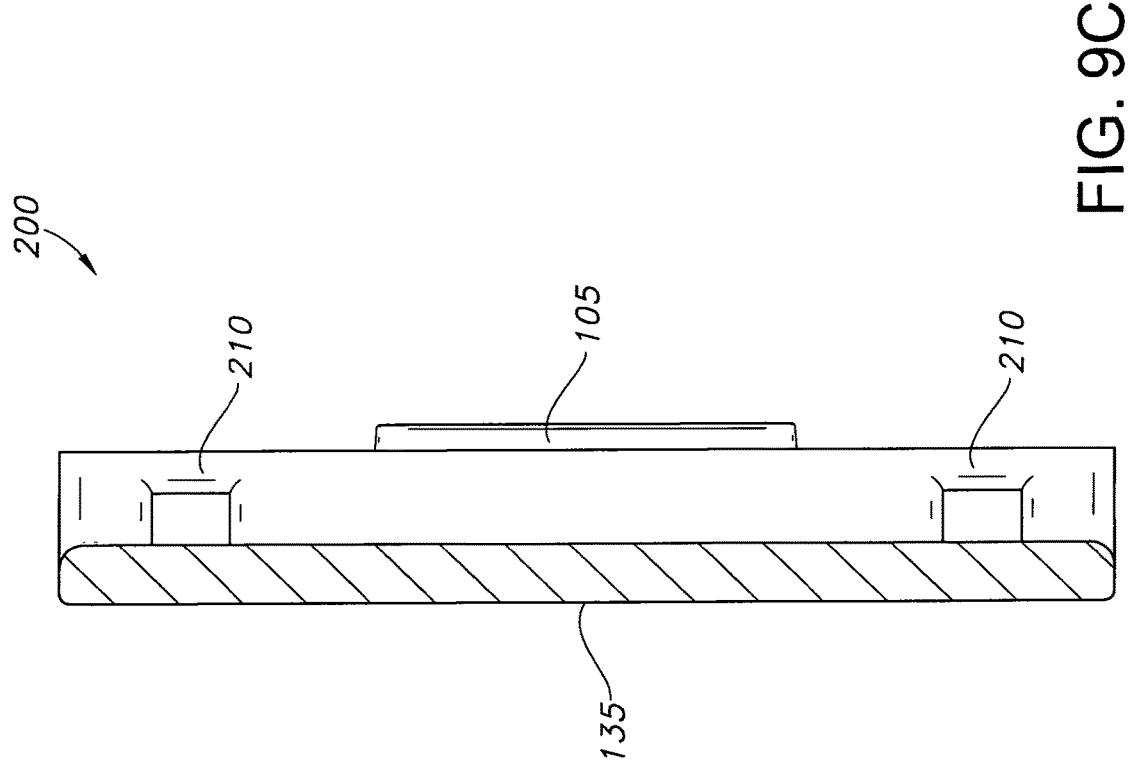

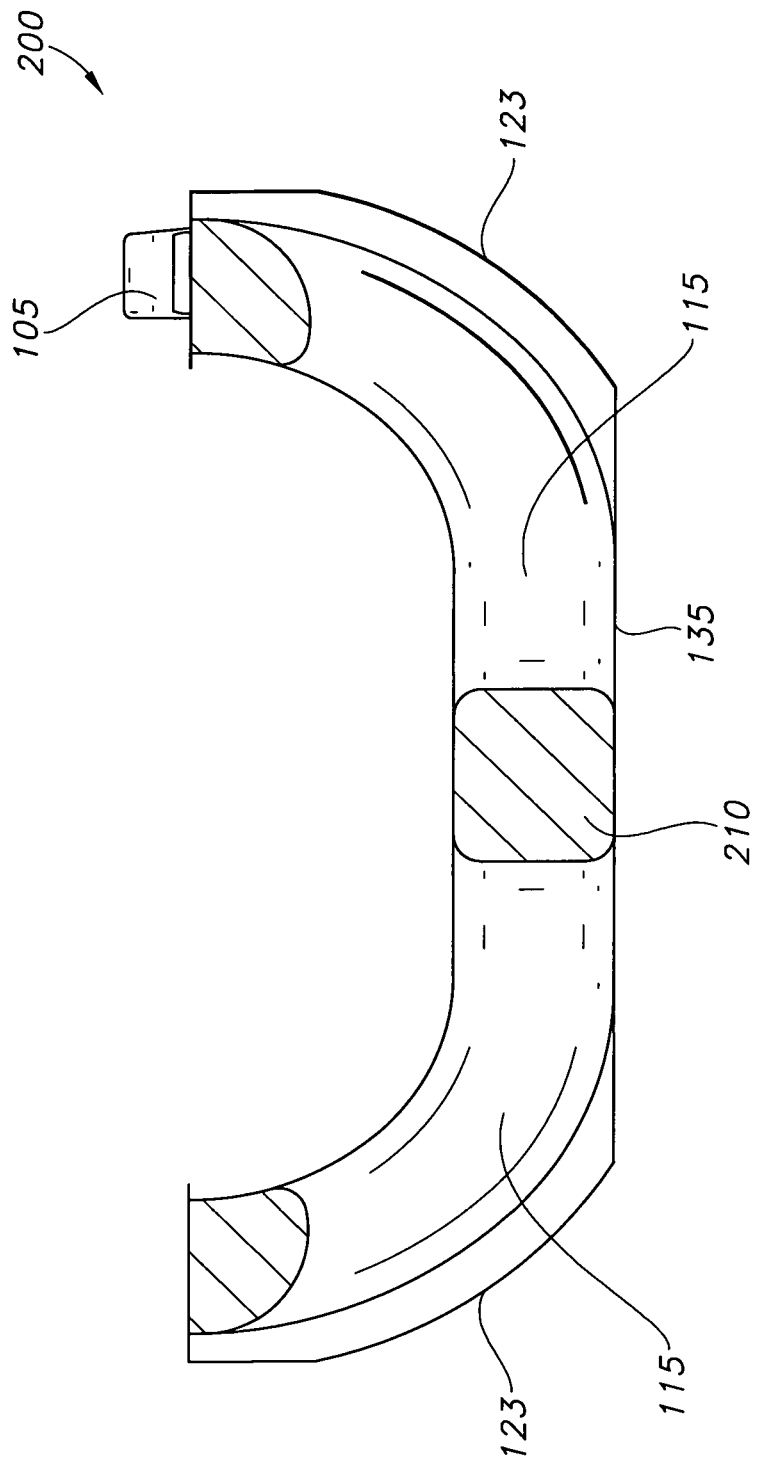

FIBER OPTIC CABLE CLAMP

CROSS REFERENCE TO OTHER PATENT APPLICATIONS

The present application claims the benefit of and priority from provisional patent application Ser. No. 62/995,061, titled: Optical Fiber Clamp, filed Jan. 8, 2020; the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Previous methods for securing and protecting optical fiber cables consist of a sheet metal saddle of the type shown in FIG. 1. Cable saddle 10 is a simple sheet metal component bent into a U-shape, designed to sit over a length of optical fiber 20 and secure the cable to a structure, such as a cableway. Cableways can also be found in other types of structural framing, such as in building, culverts, and vehicles, for example, whenever cables must be passed through structural elements. The edges of the cableway are called the cableway pan.

FIGS. 2A and 2B show an alternative view of the prior art means of securing fiber optics cable 20 in a cable way. In FIG. 2A, cables 20 are bundled and a length of flexible metal, called a hose clamp 30, is cinched around cables 20 and saddle 10, then tightened around cableway pan to contract the saddle as a means of securing saddle 10 and cables 20 to the various edges in shipboard cableways. A hose clamp is a metal ribbon often used to bound wires, pipes, cables, etc. together or to a rigid structure. FIG. 2B is a cut-away view illustrating the prior art saddle 10 and clamp 30 and how they attach to a cableway pan.

A key limitation and disadvantage of prior art saddles is that saddle 10 frequently falls out of the cableway when hose clamp 30 is removed during upgrades or routine maintenance, causing it to be discarded or lost. Optical fiber cables cannot be stacked on top of one another directly in large number due to weight and the fragile nature of glass fiber optics. Another disadvantage of the saddles is that they cannot be stacked, limiting the number of optical fiber cables, as well as other cables, that may be threaded through the cableway pan. These factors limit the quantity of cable that can be routed through a particular cableway and correspondingly the number and capacity of cables that can be routed throughout the ship or building structure. This constraint in turn limits the infrastructure carrying capacity of the fiber optics and constrains any possible future growth to support system upgrades or accommodate additional uses or technology

SUMMARY OF THE INVENTION

The present invention includes recognition of the problems and disadvantages of the prior art devices. The fiber optic clamp of the present invention is easier to use, can be produced at lower cost, and is less likely to crush or damage delicate fiber optic cables than prior art devices. The fiber optic clamp of the present invention readily facilitates the routing of additional cables without dissembling previously installed cable installations. This feature of the present invention makes expansion of fiber optic capacity by routing of additional cables much less time-consuming and makes for much more efficient use of limited cableway space than prior art clamps.

According to one aspect of the invention a fiber optic cable clamp is formed of two substantially identical halves including a tongue and groove that enables the two halves to mate together and enclose fiber optic cables within.

According to another aspect of the invention, the cable clamps of the present invention include a flat stacking surface that permits the cable clamps to be easily stacked atop each other, thereby significantly enhancing the ability to route additional cables as capacity or future technology needs grow.

According to still another aspect of the invention, the cable clamps of the present invention can be printed or molded in series in lieu of stacking individual clamps. For example, two clamps or three clamps are printed or molded as a unit when a larger number of cables are to be routed and secured.

According to yet another aspect of the invention, the cable clamps of the present invention are formed of a rigid material in lieu of the ductile sheet metal of prior art devices. The rigid construction of the present invention provides better protection for the expensive and delicate fiber optic cables which are subject to crushing and breakage with prior art designs. The rigid construction also facilitates stacking multiple clamped bundles of cables atop or adjacent to each other without risk of cable damage.

According to another aspect of the invention the cable clamps of the present invention may be manufactured using additive manufacturing techniques such as, for example, but not limited to 3D printing.

According to yet another aspect of the invention, the cable clamps of the present invention further include a slot through which a zip tie or tie device may be threaded.

According to still another aspect of the invention, the fiber optic cable clamps are constructed with rounded edges to minimize the risk that the fiber optic cable will be cut or damaged during installation of the clamp or by the clamp itself.

Further advantages and features of the present invention will be described in detail below.

BRIEF DESCRIPTION OF THE DRAWINGS

FIGS. 9A-D are illustrations of the construction of a larger fiber optic cable clamp according to an embodiment of the invention;

Like reference numerals refer to similar elements or features throughout the drawings.

DESCRIPTION OF EXEMPLARY EMBODIMENTS OF THE INVENTION

Figure 1:
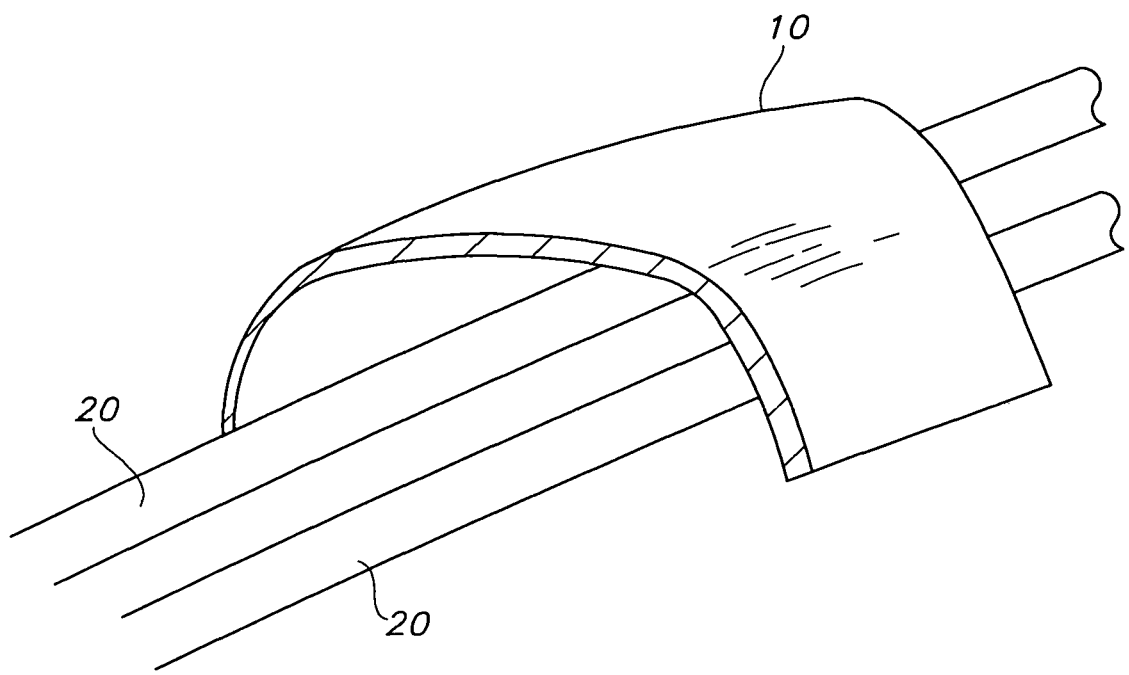
FIG. 1 is a perspective view of prior art cable clamps.
Figure 2:
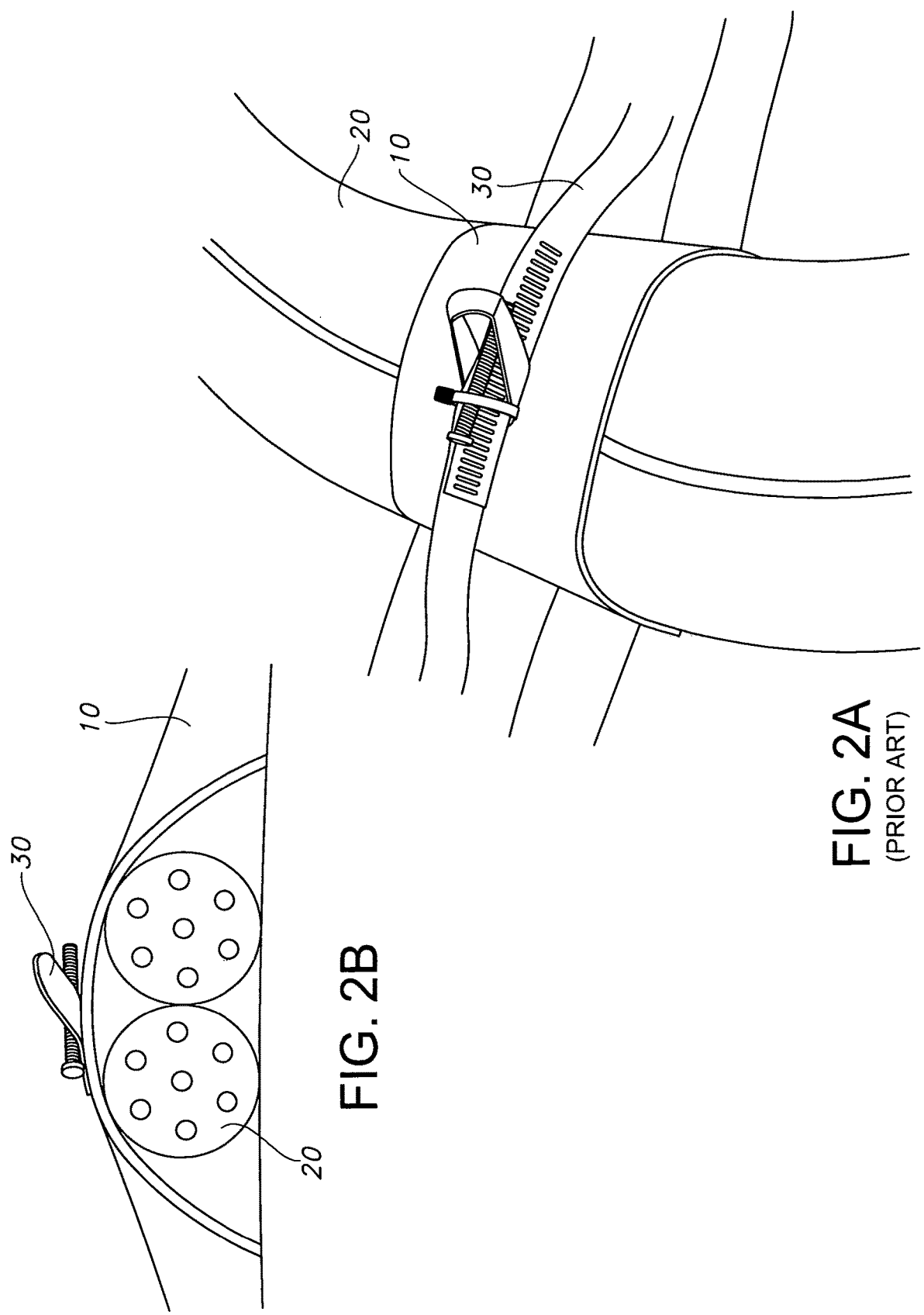
FIGS. 2A-B are illustrations of the use of prior art cable clamps.
Figure 3:
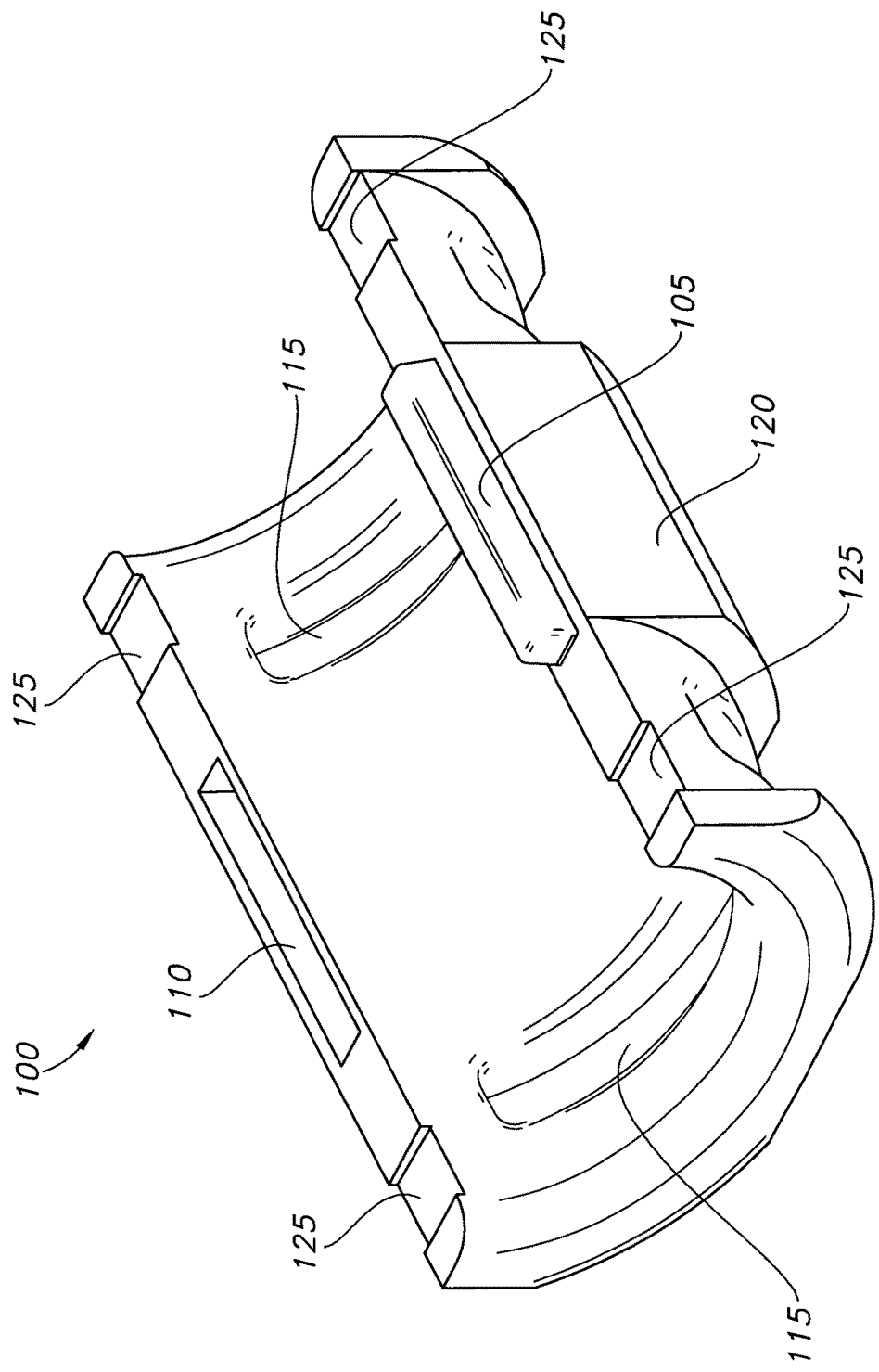
FIG. 3 is a view of a fiber optic cable clamp according to an embodiment of the invention.

FIG. 3 is an illustration of a fiber optic cable clamp 100 according to an embodiment of the invention. Fiber optic cable clamp 100 includes a tongue 105, a groove 110, a zip-tie guide 115, a flat stacking surface 120, and a disassembly notch 125. Fiber optic cable clamp 100 is designed in a manner as to be interchangeable with itself. The fact that two optical fiber clamps 100 will mate to each other eliminates the need for separate A-units and B-units, making the invention easier to use in the field and saving time with installation of cables in a structure. In operation, two halves of fiber optic cable clamp 100 are pressure fit together by pressing tongue 105 in a corresponding groove 110. The width and angle of tongue 105 and the width of groove 110 are such that pressure alone will keep them together, similar in manner to the way plastic toy building bricks snap together.

Many types of materials may be used to form fiber optic cable clamp 100 including materials commonly used in additive manufacturing. For example, in one embodiment of the invention, low-smoke no-smoke thermoplastics, such as for example, Ultem 9085, are used to protect against fires and noxious fumes in enclosed spaces, such as the interior of a ship, aircraft, submarine, building or other confined space. These materials, which are not as ductile as the sheet metal of the prior art, nor as subject to deformation, encase cables 20 in a somewhat rigid enclosure less likely to crush or damage cables 20. These materials bend or deform less than prior art clamps do when clamp 100 is secured to the cableway, thereby also permitting sufficient clamping force such that neither clamp 100 nor cables 20 vibrate loose. This latter feature is an advantage when the cableway is located on a moving structure such as ship, aircraft, submarine, or in other structures subject to vibration. Vibration in fiber optic cables not only risks dislodging the cable from the cableway, but also can introduce noise and interference into the signal carried by the cable. The present invention reduces thus additionally reduces the possibility of interference by reducing the vibrations to which cables 20 are subjected.

The more structurally stout construction of clamp 100 additionally facilitates stacking of multiple sets of clamps as to be described in more detail below. According to one possible embodiment of the invention, clamp 100 may be formed via additive manufacturing techniques or via injection molding. Other materials and manufacturing methods known to those of skill in the art may be used.

Fiber optic cable clamp 100 is printed or molded to be only slightly larger than the set of fiber optic cables it encases. For example, in one possible embodiment of the invention, if a cable is 1.5 inches in diameter, the interior diameter of fiber optic cable clamp 100 would be 1.53 inches. The interior diameter of fiber optic cable clamp 100 being only slightly larger than the cable secures fiber optic cable clamp 100 in place on the fiber optic cable and prevents fiber optic cable clamp 100 from slipping up or down the cable.

According to one embodiment of the invention, fiber optic cable clamp 100 is approximately 2.5 inches long. This length balances the structural stability of clamp 100 and the security of cables 20 while minimizing the amount of space consumed in the cableway. Dimensions other than those described above are possible.

Figure 4:
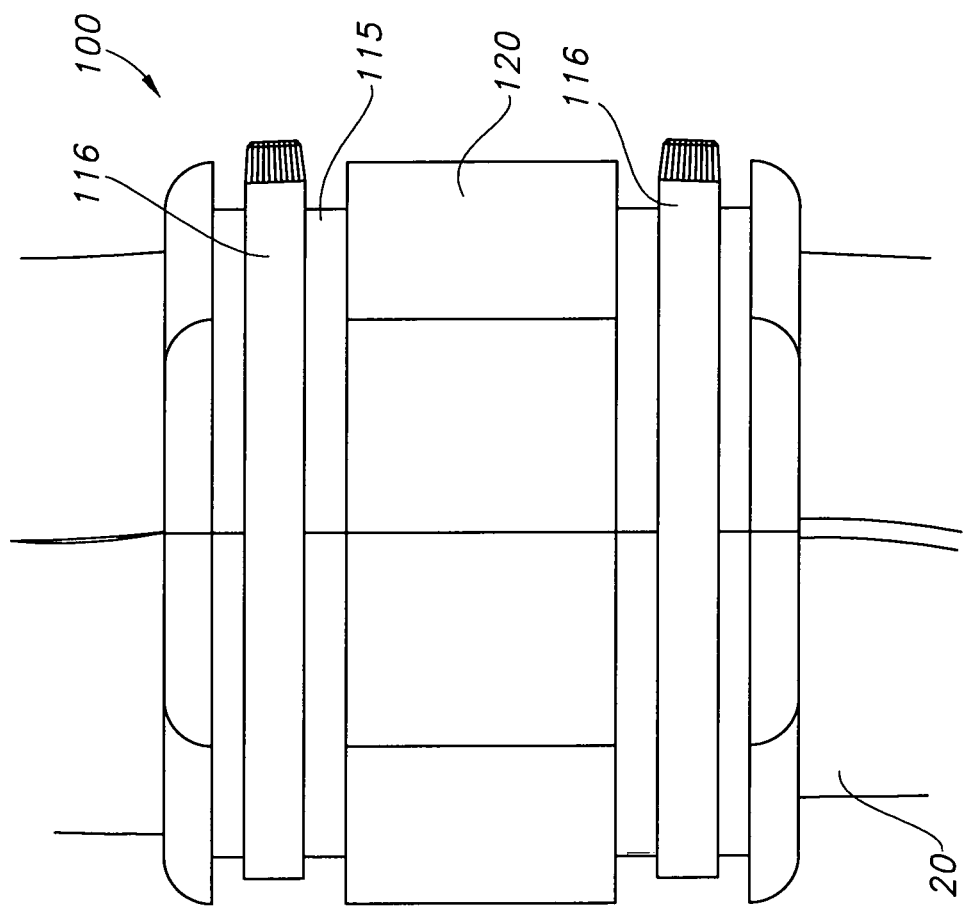
FIG. 4 illustrates securing a fiber optic cable clamp according to an embodiment of the invention.

FIG. 4 shows zip-tie guide 115 in use with a zip-tie 116. Optional zip-tie 116 is placed around fiber optic cable clamp 100 around zip-tie guide 115, through which zip-tie 116 makes contact with fiber optic cable 20, and pulled taught. The slight pressure added from a zip-tie further secures the closure of fiber optic cable clamp 100 and the slight contact provides additional friction to keep fiber optic cable clamp 100 in place on the fiber optics cables 20. In one possible embodiment of the invention, zip-tie guide 115 is ⅕ inch wide. As will be evident to those of ordinary skill in the art, tie guide 115 may be sized to accommodate other types and dimensions of ties.

Should it ever be desired to remove or open clamp 100, zip tie 116 is first cut or otherwise removed when installed. Then, fiber optic cable clamp 100 is pried apart by inserting a flat edged tool, such as a flat-head screwdriver, into dis-assembly notch 125, and applying slight torque to assist in separating the halves of fiber optic cable clamp 100.

Figure 5C:
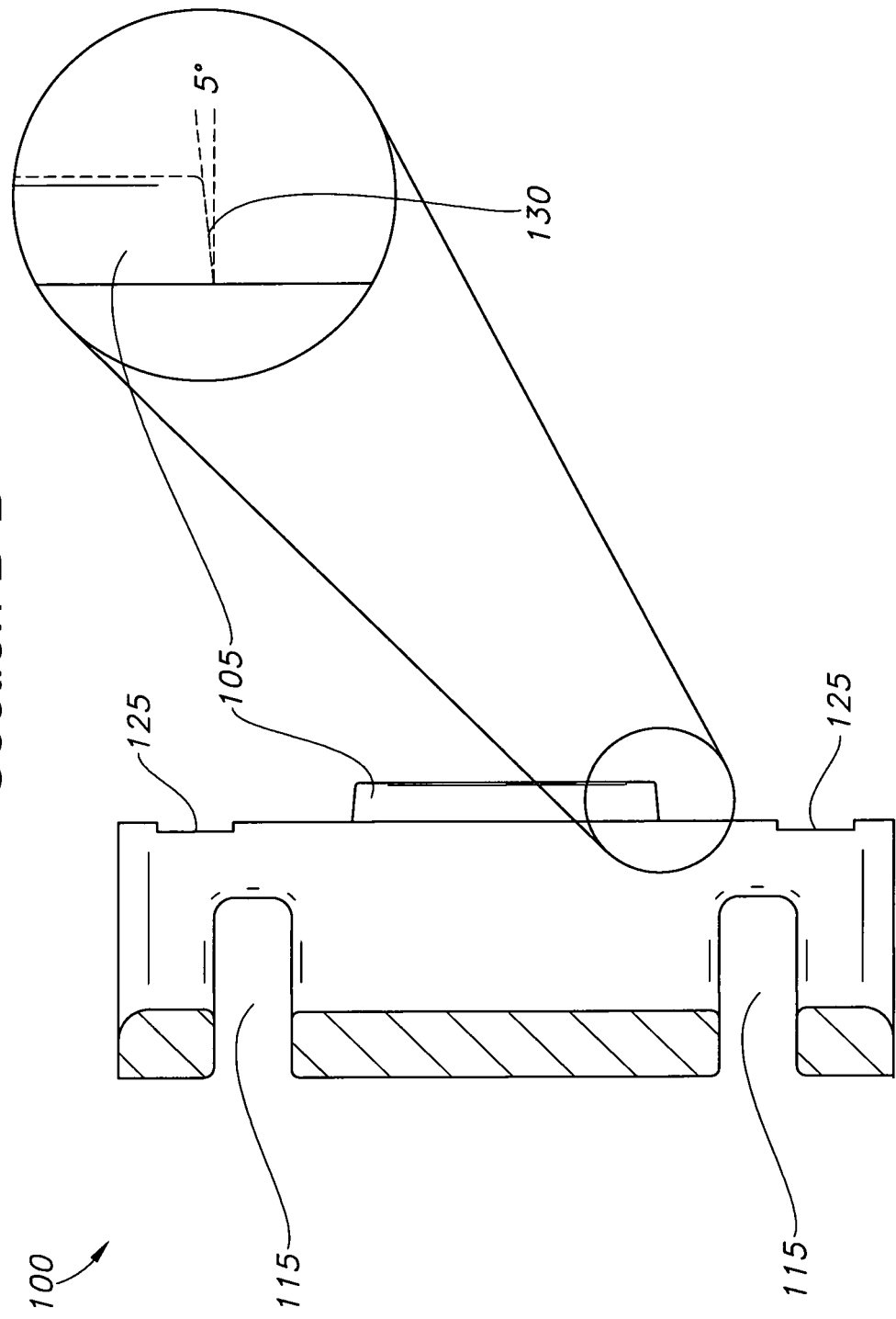
FIGS. 5 A-D are illustrations of the construction of a fiber optic cable clamp according to an embodiment of the invention.

FIGS. 5A-D are various views of fiber optic cable clamp 100, showing in more detail its construction. FIG. 5A is an illustration of fiber optic cable clamp 100 as viewed from above looking into the interior of fiber optic cable clamp 100. Fiber optic cable clamp 100 is solid structure that may be formed by a variety of methods including either 3D printed or injection molding. FIG. 5B is a cut-away view of section A-A of fiber optic cable clamp 100 illustrating this solid structure.

FIG. 5B also illustrates rounded corners 123 and the location of optional parts information panel 135 of fiber optic cable clamp 100. Rounded corners 123 are shaped to reduce or eliminate the risk of cutting or damaging the cables, wires, or other items routed through clamp 100. Fiber optic cables comprise filaments of optical fiber that can very easily be crushed or damaged during installation, contact with the cableway, or contact with the clamp. This risk is especially high when using prior art cable clamps. Not only does the simple installation made possible by clamp 100 reduce all of the aforementioned risks, but rounded edges 123 further reduce risk of damage.

FIG. 5C is a cut-away view of section B-B of fiber optic cable clamp 100. Seen in FIG. 5C is zip-tie guide 115. Zip tie guide 115 is an opening in fiber optic cable clamp 100 around which a zip-tie (shown in FIG. 4), or other similar tie, cord, or fastener as readily known to those of skill in the art, can be secured.

Figure 5D:
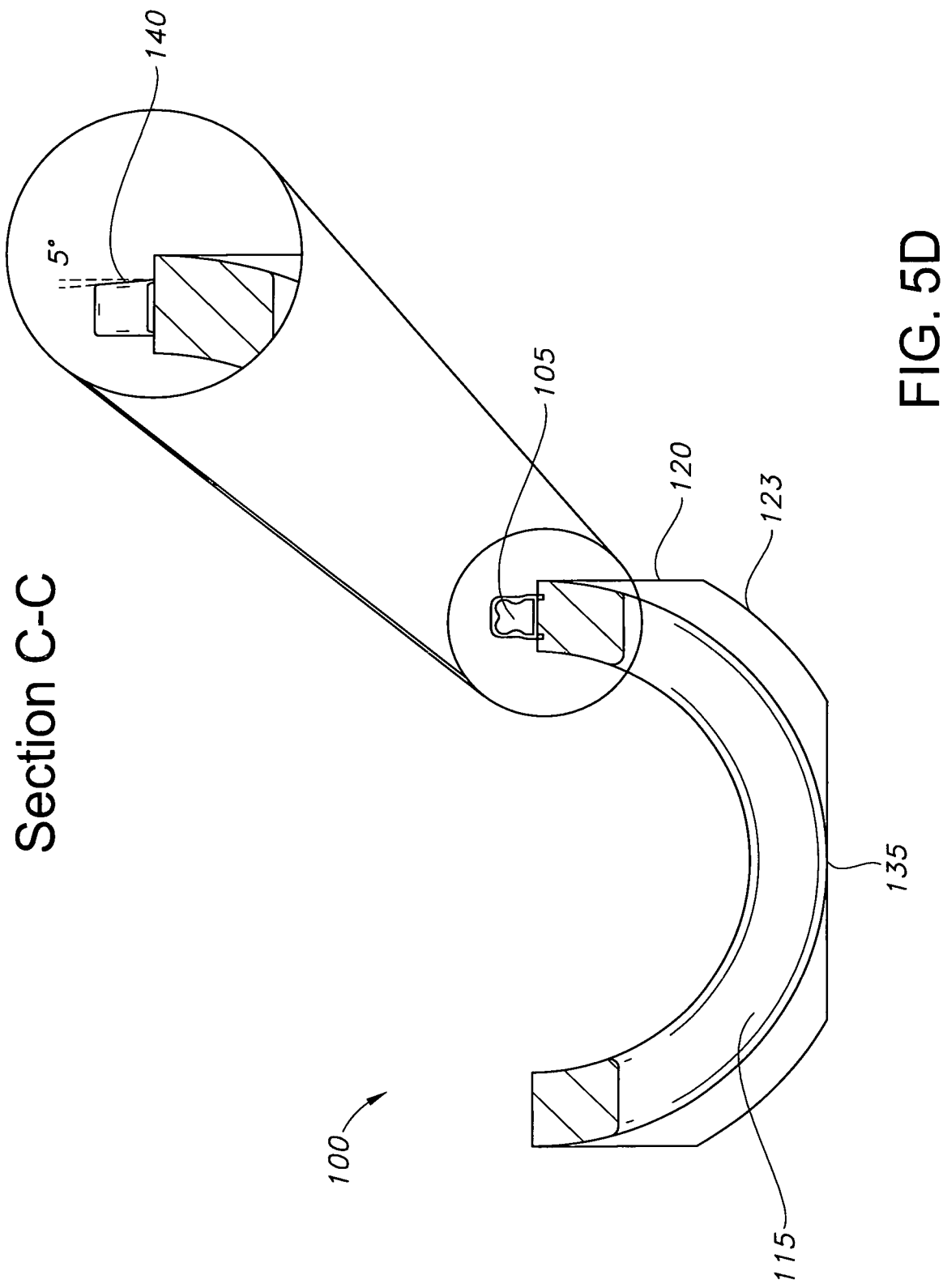

FIG. 5C also shows a close up of the end 130 of tongue 105. In one embodiment the 5° angle of end 130 aids in assembly of fiber optic cable clamp 100 by ensuring flat edges surrounding tongue 105 are pressed flush against the flat edges surrounding groove 110. Tongue 105 and groove 110 are also shown in FIG. 5D, which is a cut-away view of clamp 100 at section C-C. Outward face 140 of tongue 105 is also visible in FIG. 5D. The 5° angle of outward face 140 aids in assembly of fiber optic cable clamp 100 in the same manner as end 130. Also shown in FIG. 5D is the opening of zip-tie guide 115 which extends through most of fiber optic cable clamp 100.

In prior art, the metal optical cable saddles 10 are bent over three sides of the cables 20, then secured to cableway pan by a hose clamp. One side is left unprotected. If more cables are needed, they must be secured to the edges of the cableway pan. The delicate nature of the fiber optic cables makes it difficult to stack the cables, clamped or otherwise, on top of one another. In prior art, if the cables were to be stacked, the pressure of the hose clamps on the optical cable saddles and the weight of the cables would damage the fiber optics in the cables.

According to an embodiment of the invention, if more cables than can be accommodated in a single pair of clamps 100 are desired, additional cables secured by additional sets of clamps 100 may be used. FIG. 5D shows a cut-away view of section C-C of cable clamp 100 in which a substantially flat stacking surface 120 is illustrated. Stacking surface 120 is additionally shown in FIG. 5A.

When more cables than can fit inside of clamp 100 must be routed; or when a subsequent cable installation is desired at another time, a second set of optical fiber clamps 100 may be stacked on the first set of clamps 100 at flat stacking surface 120. A third fiber optic cable clamp 100, and so on, can follow in the same manner as desired.

Such multiple pairs of clamps 100 and their respective cables may themselves be grouped together, via a hose clamp, and hung in the cableway. The delicate fiber optic cables are thus not stacked in direct contact with each other but each layer or set of cables is protected from the adjacent layers above by clamp 100. Clamp 100 therefore acts like a shield or protective sheath that keeps the cables from being damaged from the additional cables and cable clamps. Unlike prior art clamps, when assembled clamp 100 as shown in FIGS. 5A-5D encircles cables 20.

Figure 6:
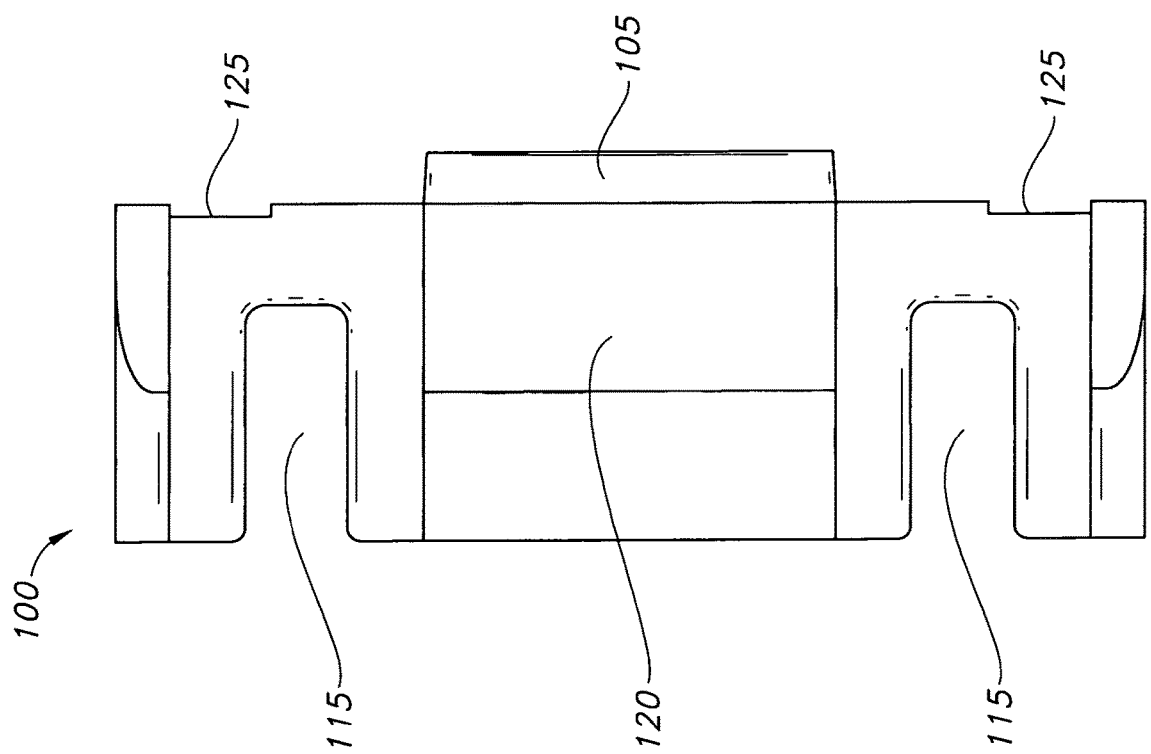
FIG. 6 shows a side view of a fiber optic cable clamp according to an embodiment of the invention.
Figure 7:
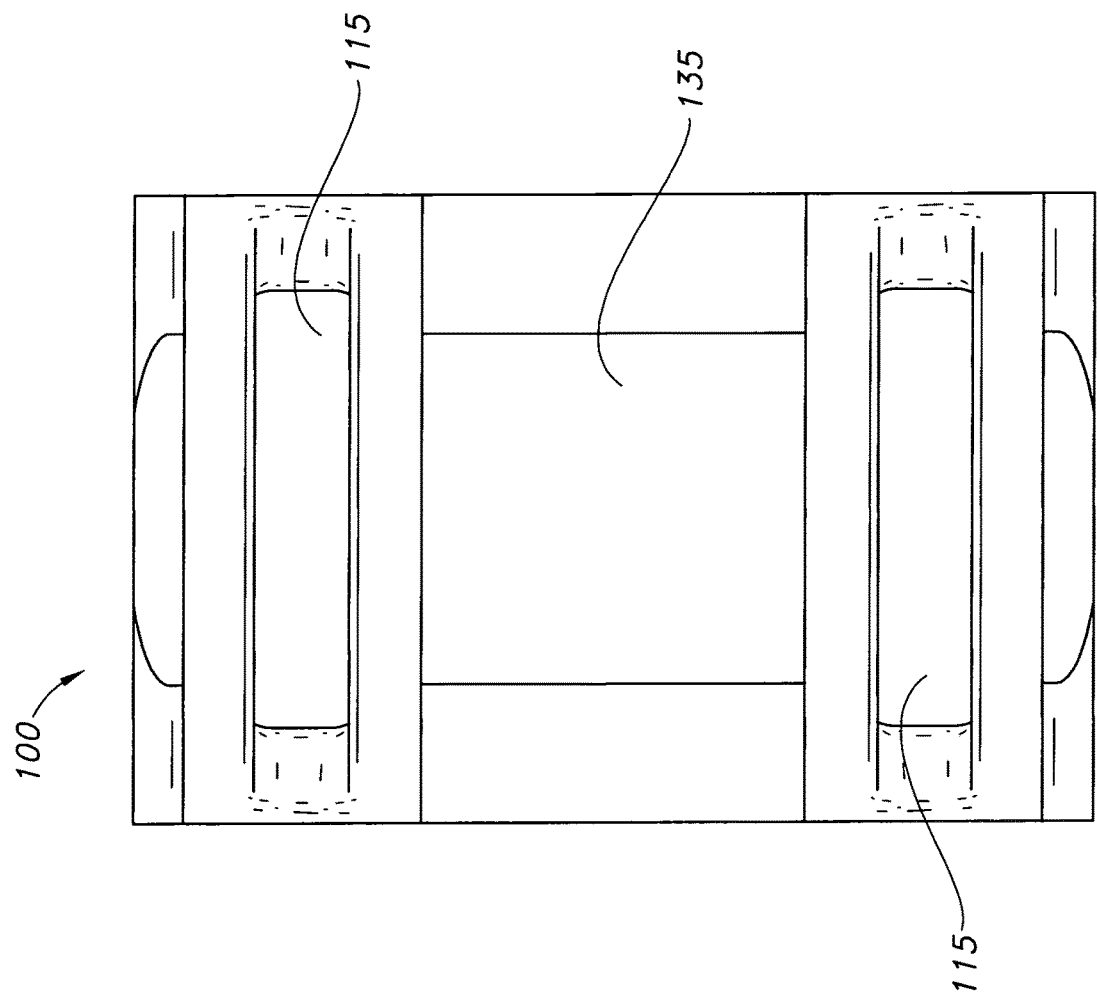
FIG. 7 is a view of the back of a fiber optic cable clamp according to an embodiment of the invention.
Figure 8:
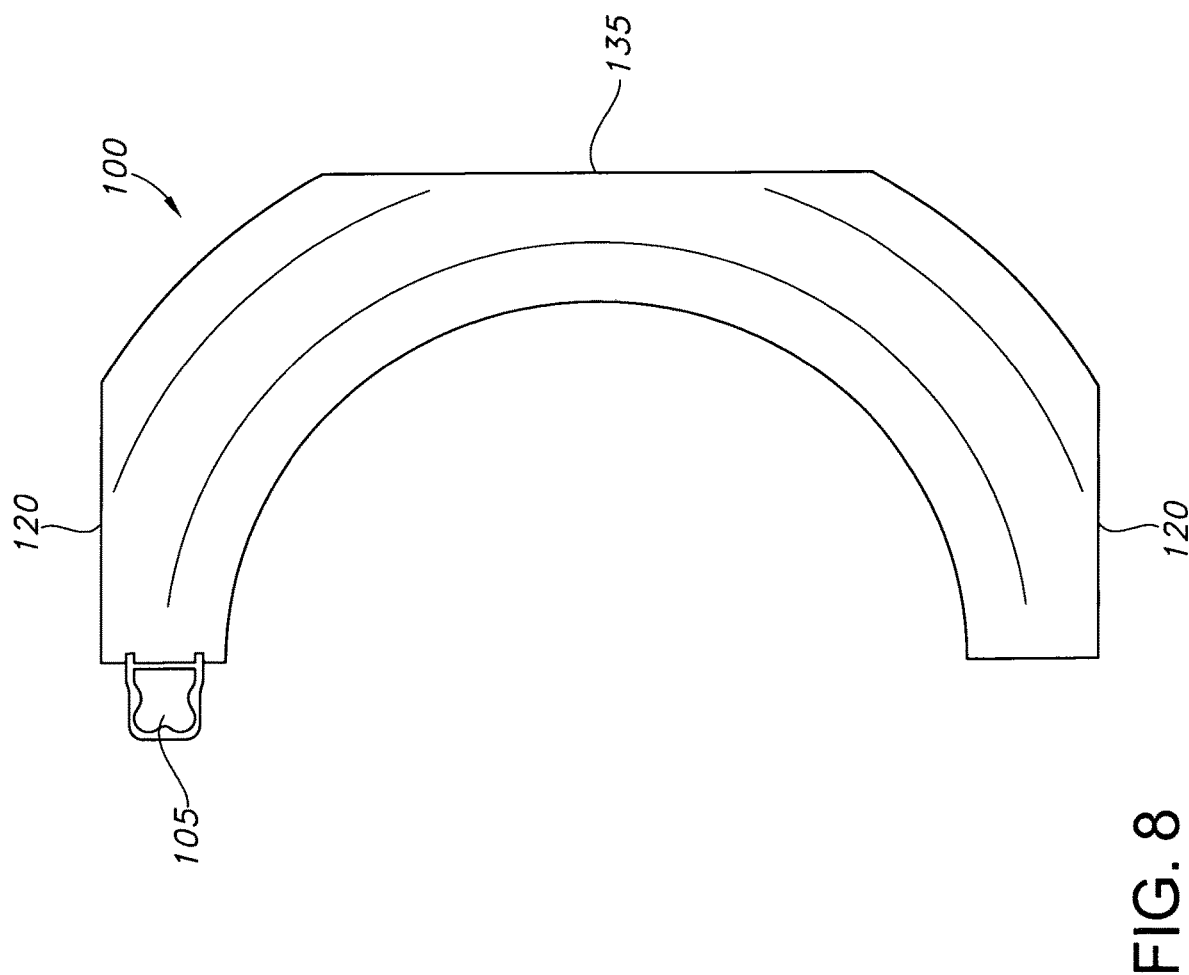
FIG. 8 is an end view of a fiber optic cable clamp according to an embodiment of the invention.

FIG. 6 is an illustration of fiber optic cable clamp 100 as viewed from the side. FIG. 7 is an illustrative view of the back of fiber optic cable clamp 100, including optional part information panel 135. Part information panel 135 may be used to include pertinent information about fiber optic cable clamp 100, for example, clamp size, cable capacity, or part number. In one possible embodiment of the invention, information panel 135 is embossed or stamped or printed into or on clamp 100. When information panel 135 comprises a label, the label increases the dimensions of clamp 100 and may reduce the total volume of clamps in the cableway, or otherwise interfere with stacking of clamps 100. FIG. 8 shows a view of fiber optic cable clamp 100 as seen from either end.

Figure 9A:
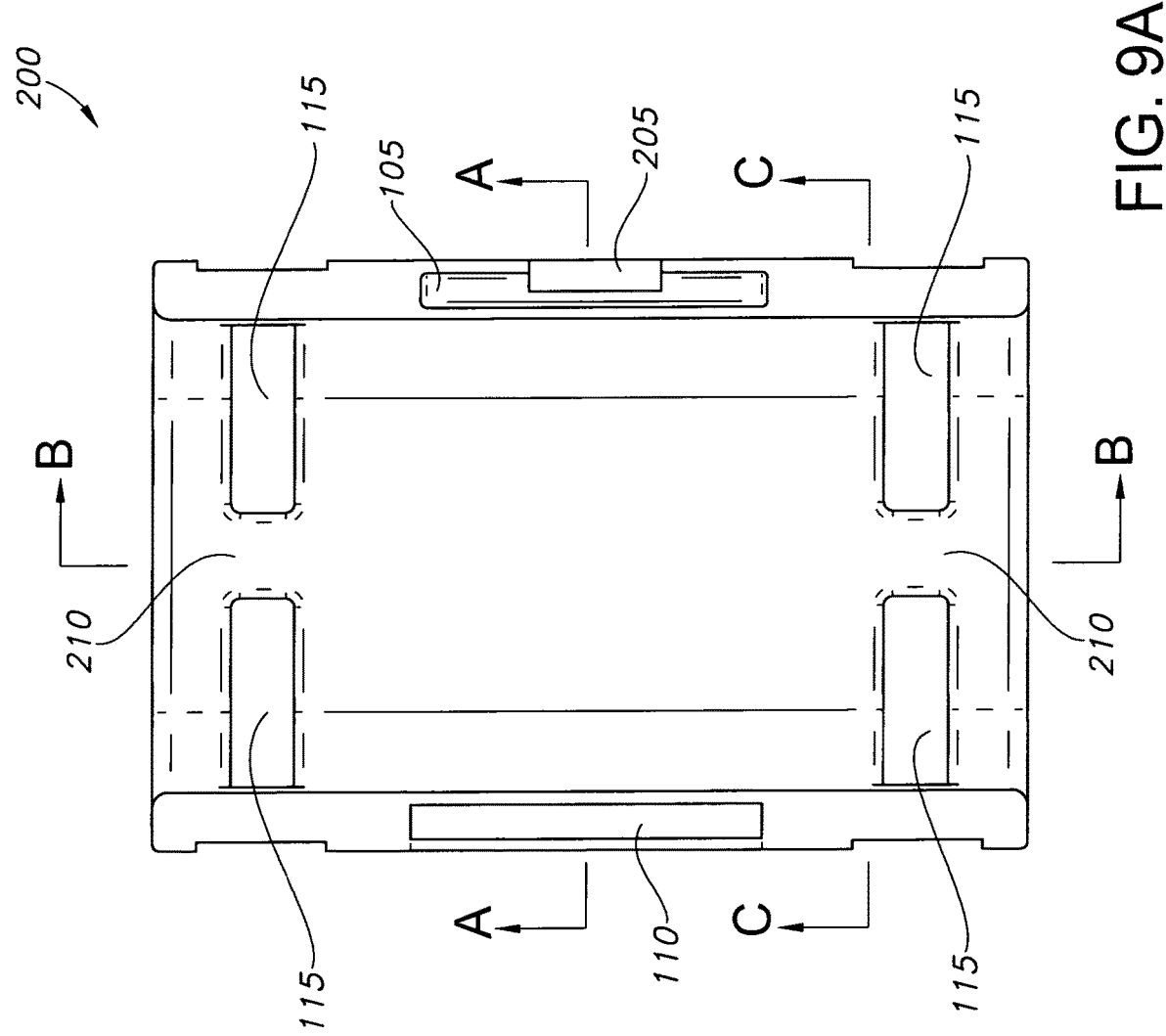

Yet another embodiment of the invention allows for securing a greater number of cables 20, or optionally larger diameter fiber optics cables via a larger fiber optic cable clamp 200 as illustrated in FIGS. 9A-D. FIG. 9A includes enlarged dis-assembly notch 205 and zip-tie bracket 210. Fiber optic cable clamp 200 possesses many of the same characteristics of fiber optic cable clamp 100, including the solid construction of its internal structure, as seen in the cut-away of section A-A in FIG. 9B. In one possible embodiment of the invention of FIGS. 9A-D, clamp 200 has a length of 2.5 inches, a width of 1.73 inches, and a height of 0.44 inches.

FIG. 9B shows the location of larger dis-assembly notch 205. Larger dis-assembly notch 205 operates in the same manner as dis-assembly notch 125 by inserting a flat edged tool, such as a flat-head screwdriver, into larger dis-assembly notch 205 and applying slight torque to assist in separating the halves of larger fiber optic cable clamp 200.

FIG. 9C is a cut-away of section B-B, further showing the solid internal construction of larger fiber optic cable clamp 200. FIG. 9D is a cut-away of section C-C, and shows how zip-tie guide 115 is bisected by zip-tie bracket 210 in this embodiment of the invention.

Figure 10:
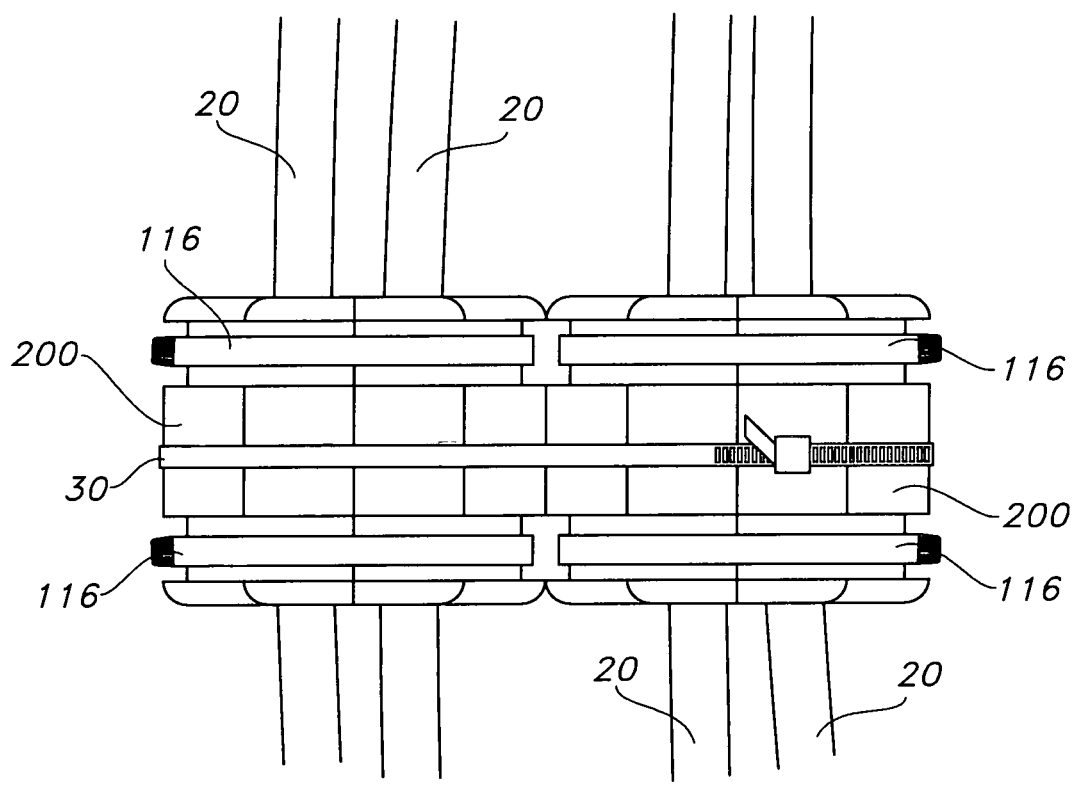
FIG. 10 is an illustration of securing a larger fiber optic cable clamp according to an embodiment of the invention.

Larger fiber optic cable clamp 200 operates in similar manner as fiber optic cable clamp 100 shown in FIG. 3, by pressure fitting together two halves of larger fiber optic cable clamp 200. In this embodiment, zip-tie guide 115 allows access for a zip-tie to be threaded between cables instead of around the clamp, illustrated in FIG. 10. A zip-tie loops over zip-tie bracket 210, threads through zip-tie guide 115, between a set of cables where the zip-tie comes in contact with the cables, through zip-tie guide 115 of another larger fiber optic cable clamp 200, and loops around a corresponding zip-tie bracket 210 where it is secured closed. In this embodiment, zip-tie bracket 210 operates in a similar function to zip-tie guide 115 as described in FIG. 3: the slight pressure added from a zip-tie further secures the closure of larger fiber optic cable clamp 200 and the contact with the cable provides additional friction to keep larger fiber optic cable clamp 200 in place on the fiber optics cables.

Figure 11:
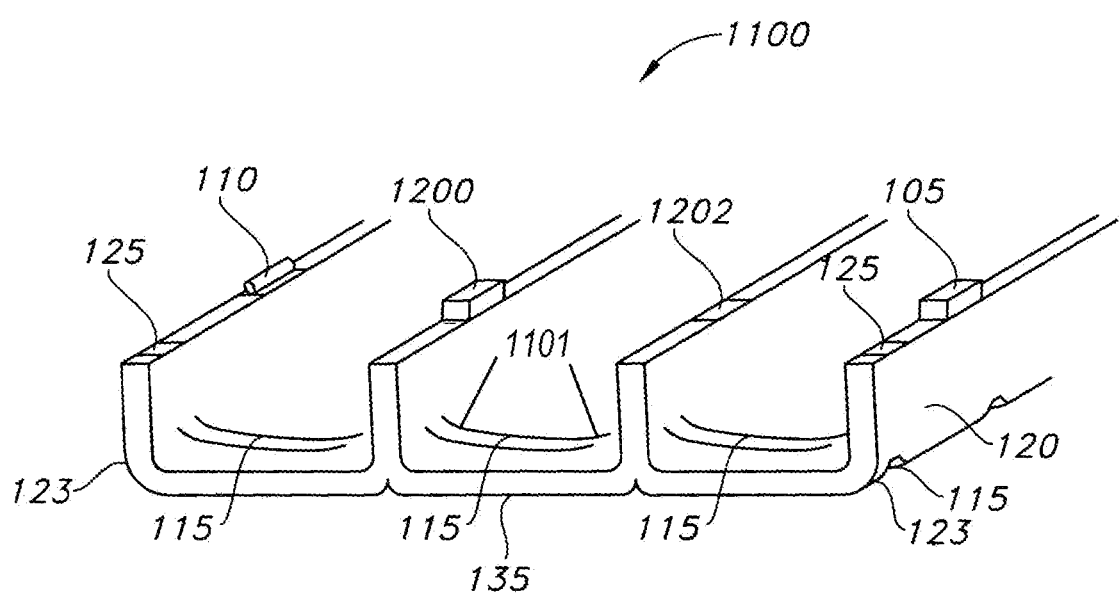
FIG. 11 illustrates a plurality of clamps made in a series in lieu of stacking individual clamps according to an embodiment of the invention.

FIG. 11 illustrates an alternative embodiment in which a plurality of clamps 100 are produced in series as a single unit 1100. Unit 1100 can be produced via a variety of manufacturing methods known to those of skill in the art including, but not limited to, injection molding and additive manufacturing. The construction of FIG. 11 provides the benefits of stacking multiple clamps 100 to route larger numbers of cables 20 but also provides the additional benefit of reducing the amount of labor needed to install multiple clamp unit 1100. Clamp unit 1100 also reduces weight and volume over use of the same number of individual clamps 100. Clamp 1100 as drawn shows tongue and grooves 1200 and 1202 in a center section of clamp 1100. In an alternative embodiment, clamp 1100 may be manufactured without tongue and grooves 1200 and 1202. In addition, although the embodiment of FIG. 11 shows three clamps 100 formed in series to create unit 1100, unit 1100 can be formed of any desired number of clamps 100, and the tongue and groove structures omitted or included as desired to mate the halves of clamp 1100 which may include concave interior surfaces 1101.

The subject matter defined in the appended claims is not necessarily limited to the specific features or acts described above. For example the clamp of the present invention may be used with other types of cables and is not invented to use with just fiber optic cables. Other types of cables may include coax cable, hoses, flexible plumbing, and twisted pair wiring. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for clamping a cable, comprising the steps of:
   placing the cable in a first substantially concave part having a first tongue and a first groove and an end with rounded edges;
   securely mating a second substantially concave part having a second tongue and a second groove to said first part by pressing said first tongue into said second groove and pressing said second tongue into said first groove to encase the cable between said first part and said second part; and,
   tying a tie around an exterior surface perimeter formed by said first part and said second part after said first and second parts are mated together.

2. A method for clamping a plurality of cables, comprising steps of:

placing a first cable in a first part having a first tongue and a first groove;

mating a second part having a second tongue and a second groove to said first part by pressing said first tongue into said second groove and pressing said second tongue into said first groove to encase the first cable between said first and second part;

placing a second cable in a third part having a third tongue and a third groove;

mating a fourth part having a fourth tongue and a fourth groove to said third part by pressing said third tongue into said fourth groove and pressing said fourth tongue into said third groove to encase the second cable between said third part and said fourth part;

placing a first exterior surface of said first and second parts when joined together next to a flat exterior surface of said third and fourth parts when joined together next to a flat exterior surface of said third and fourth parts when joined together; and, tying a tie around said first part and second part after said first and said second parts are mated together.

3. A method for clamping a plurality of cables, comprising steps of:

placing a first cable in a first part having a first tongue and a first groove;

mating a second part having a second tongue and a second groove to said first part by pressing said first tongue into said second groove and pressing said second tongue into said first groove to encase the first cable between said first and second part;

placing a second cable in a third part having a third tongue and a third groove;

mating a fourth part having a fourth tongue and a fourth groove to said third part by pressing said third tongue into said fourth groove and pressing said fourth tongue into said third groove to encase the second cable between said third part and said fourth part;

placing a flat exterior surface of said first and second parts when joined together next to a flat exterior surface of said third and fourth parts when joined together next to a flat exterior surface of said third and fourth parts when joined together; and, tying a tie around said third part and said fourth part after said third and said fourth parts are mated together.

4. A method for clamping a plurality of cables, comprising steps of:

placing a first cable in a first part having a first, tongue and a first groove;

mating a second part having a second tongue and a second groove to said first part by pressing said first tongue into said second groove and pressing said second tongue into said first groove to encase the first cable between said first and second part;

placing a second cable in a third part having a third tongue and a third groove;

mating a fourth part having a fourth tongue and a fourth groove to said third part by pressing said third tongue into said fourth groove and pressing said fourth tongue into said third groove to encase the second cable between said third part and said fourth part;

placing a flat exterior surface of said first and second, parts when joined together next to a flat exterior surface of said third and fourth parts when joined together next to a flat, exterior surface of said third and fourth parts when joined together; and, tying a tie around said first, second, third, and fourth parts after said first and second parts are placed next to said third and fourth parts.

5. A clamp for securing a cable, comprising:

a first half and a second half formed of thermoplastic, each half having a substantially concave interior portion and each half further including:

a tongue and a groove;

a flat surface located on an exterior portion;

a first and second ends, each end having rounded edge surfaces; and a channel located on an exterior circumference of said first and second halves, wherein said channel is sized to hold a tie, wherein said tongue and said groove of said first half is sized and positioned to mate securely with said groove of said second half, and said tongue of said second half is sized and positioned to mate securely with said groove of said first half; and, a disassembly notch located on each of said first and said second halves.

6. The clamp of claim 5, wherein said thermoplastic comprises a low-smoke thermoplastic.

7. The clamp of claim 6, wherein said thermoplastic comprises Ultem 9085.

8. A clamp for securing a plurality of cables, comprising:

a first half and second half formed of thermoplastic, each half having a plurality of substantially concave surfaces on an interior portion of each half, wherein each half further includes:

a tongue and a groove;

a flat surface located on an exterior portion;

a first and second ends, each end having rounded edge surfaces; and a slot sized to accept a tie; wherein said tongue of said first half is sized and positioned to mate securely with said groove of said second half, and said tongue of said second half is sized and positioned to mate securely with said groove of said first half; and, a disassembly notch located on each of said first and said second halves.

9. The clamp of claim 8, wherein said thermoplastic comprises Ultem 9085.

10. The clamp of claim 8, wherein said thermoplastic comprises a low-smoke thermoplastic.

11. The clamp of claim 8, wherein said plurality of concave surfaces comprises three substantially concave interior surfaces.

\* \* \* \* \*